United States Patent
Lundberg

(10) Patent No.: US 10,405,568 B2
(45) Date of Patent: Sep. 10, 2019

(54) FLOWABLE FOOD COMPOSITION WITH WATER-HOLDING AND LUBRICATING AGENTS

(71) Applicant: Tracy L. Lundberg, Osseo, WI (US)

(72) Inventor: Tracy L. Lundberg, Osseo, WI (US)

(*) Notice: Subject to any disclaimer, the term of this patent is extended or adjusted under 35 U.S.C. 154(b) by 570 days.

(21) Appl. No.: 14/032,327

(22) Filed: Sep. 20, 2013

(65) Prior Publication Data

US 2014/0141132 A1 May 22, 2014

Related U.S. Application Data

(60) Provisional application No. 61/796,716, filed on Nov. 19, 2012.

(51) Int. Cl.

| | |
|---|---|
| *A23L 29/231* | (2016.01) |
| *A23L 29/256* | (2016.01) |
| *A23L 29/269* | (2016.01) |
| *A23L 7/10* | (2016.01) |
| *A23L 19/00* | (2016.01) |
| *A23L 19/20* | (2016.01) |
| *A23L 27/10* | (2016.01) |
| *A23L 27/60* | (2016.01) |
| *A23L 33/21* | (2016.01) |

(52) U.S. Cl.
CPC ............ *A23L 29/231* (2016.08); *A23L 7/115* (2016.08); *A23L 19/03* (2016.08); *A23L 19/09* (2016.08); *A23L 19/20* (2016.08); *A23L 27/10* (2016.08); *A23L 27/105* (2016.08); *A23L 27/60* (2016.08); *A23L 29/256* (2016.08); *A23L 29/269* (2016.08); *A23L 33/21* (2016.08)

(58) Field of Classification Search
CPC .......... A23V 2250/50; A23V 2250/502; A23V 2250/5026; A23V 2250/5034; A23V 2250/5072; A23V 2250/50722; A23V 2250/5086; A23V 2250/5116; A23V 2250/5108; A23V 2250/51082; A23V 2250/51084; A23V 2250/51086; A23V 2250/51088; A23V 2250/184; A23V 2200/242; A23V 2200/30; A23L 1/221; A23L 1/24; A23L 1/243; A23L 1/39; A23L 1/0541; A23L 1/0035
USPC ................................. 426/115, 589, 638, 650
See application file for complete search history.

(56) References Cited

U.S. PATENT DOCUMENTS

| | | | | |
|---|---|---|---|---|
| 3,399,064 A | * | 8/1968 | Partyka et al. ............... | 426/589 |
| 4,242,361 A | * | 12/1980 | Christ ..................... | A23B 7/105 426/49 |
| 4,428,968 A | * | 1/1984 | Hsu ........................ | A23B 7/105 426/49 |
| 4,636,393 A | * | 1/1987 | Lynch ..................... | A23L 1/317 426/276 |
| 5,158,014 A | * | 10/1992 | Hengstenberg ......... | B65B 25/04 100/118 |
| 5,508,055 A | * | 4/1996 | Rubow .................. | A23L 29/231 426/573 |
| 5,965,190 A | * | 10/1999 | Gallaher et al. ............... | 426/615 |
| 2005/0169970 A1 | * | 8/2005 | Aquino ........................ | 424/439 |
| 2008/0121654 A1 | * | 5/2008 | Pikowski ....................... | 222/129 |

FOREIGN PATENT DOCUMENTS

| | | | | |
|---|---|---|---|---|
| WO | WO 9534219 A1 | * | 12/1995 | ........... A23L 29/262 |
| WO | WO-9534291 A1 | * | 12/1995 | ........... A61K 9/0007 |

OTHER PUBLICATIONS

Fiber Content of Foods in Common Portions, Harvard University Health Services, May 2004, 2 pages.*
Marion cunningham, Fanny Farmer Cookbook, Thirteenth Edition, Published by Alfred A. Knopf New York, 1997, pp. 278-279.*

* cited by examiner

*Primary Examiner* — Jyoti Chawla
(74) *Attorney, Agent, or Firm* — Armstrong Teasdale LLP

(57) ABSTRACT

A flowable food composition product utilizing a novel blend of ingredients and a method for creating the same is provided. The flowable food composition includes a food product having a liquid component, such as a condiment like sauerkraut, that is combined with a water-holding agent and a lubricating agent to allow the food composition to flow from a flexible squeeze-type bottle. The method for creating this food product comprises adding a water-holding agent and a lubricating agent to a raw food material which, in some cases, has been strained and chopped, enabling the mixture to become flowable from a flexible package, such as a plastic squeeze bottle.

8 Claims, 2 Drawing Sheets

FLOWABLE FOOD COMPOSITION WITH WATER-HOLDING AND LUBRICATING AGENTS

CROSS-REFERENCE TO RELATED APPLICATION

This application is based upon and claims the benefit of United States Provisional Application Ser. No. 61/796,716, filed Nov. 19, 2012.

BACKGROUND OF THE INVENTION

The present invention relates to the manufacture of flowable food composition utilizing a combination of novel food ingredients. A need and opportunity was recognized in the food condiment market for offering many popular food toppings in an innovative and convenient new way to consumers.

Products currently on the market closest in comparison to the flowable food composition products of the present invention are pickle relish and other food condiments sold in cans, glass jars and/or plastic poly bags. Other examples of such food condiments include sauerkraut, roasted red peppers and pickles. The problem with existing prior art products on the market is lack of convenience and waste. Some of the current condiment products also have undesirable mouthfeel characteristics due to the high percentage of gums used in the preparation of the product, making them feel slimy when eaten or release free water when squeezed or stored.

Currently, some food products on the market containing food gums for both water-holding and lubrication, such as pickle relish, have a slimy or gummy mouthfeel and texture, taking away from the product's potential for optimal taste, texture and overall consumer experience. As such, there is a need for a flowable food composition that has a desirable mouthfeel and texture, while also remaining convenient to dispense and use, as in the present invention,

BRIEF SUMMARY OF THE INVENTION

It is a feature of the present invention to provide a flowable food composition that includes a water-holding agent and a lubricating agent, such that flowable food composition is flowable and may be squeezed from a flexible container, while maintaining a desirable mouthfeel and texture when eaten.

The present invention is unique because due to the novel blend of ingredients, consisting of one or more water-holding agents and one or more lubricating agents, the producer can use fewer gums or even no additional gums, if the proper lubricant is used, in condiment food products. Many foods can be improved by the use of water-holding and lubricating agents as in the present invention. Through the use of the water-holding agents and lubricating agents as in the present invention, a flowable food composition can be created that is convenient for consumers to dispense and use, while also maintaining sensory characteristics that are desirable to consumers, In the present invention, the water-holding agent absorbs free or excess free liquid in a product while providing body and a matrix for the water to be held within the condiment. Therefore products commonly referred to as fibers (e.g. oat, wheat, pea, carrot, apple, citrus, bamboo, potato, cottonseed, cellulose and microcrystalline cellulose) can all be used as the water-holding agent in the present invention.

The present invention also utilizes a lubricating ingredient (also known as a hydrocolloid) such as food gums, starches, or oils, increase viscosity of aqueous solutions and help provide the texture, gelling and lubrication characteristics of foods. Food gums are derived primarily from plants and are used as thickeners, gel forming agents, and/or stabilizing agents in food. Common food gums include carrageenan, xanthan, guar, alginate, pectin, carboxymethylcellulose (CMC), tara, gellan, konjac, Methycellulose, hyroxy propyl methylcellulose, ethylcellulose, gum Arabic, gelatin and locust bean starch among others. Examples of starches include native or modified versions of corn, potato, wheat and tapioca. Examples of oils that can be used for lubrication include those of canola, vegetable, soybean, palm, dairy fats and oils, etc. An of thee lubricating ingredients may be used as the lubricating agent in the present invention.

The condiment solids can be changed by the lubricating agent and water-holding agent enough to enable good flow through an opening of a squeeze bottle or package while also maintaining desirable sensory attributes such as a light color and a clean (not slimy) mouthfeel. For example, chopping the condiment solids to a desired consistency, then mixing in the lubricating and water-holding ingredients, will create the flowable food composition of the present invention. The degree of chopping required will depend on the base food product being used.

According to a still further broad aspect of the present invention there is provided a process of creating the flowable food composition whereby a whole food product, such as cabbage, pickles, tomato, pepper, cucumber, etc. is screened to remove excess free liquid from solids, chopped, fermented (if necessary), mixed with the novel blend of water-holding and lubricating agents to make a flowable condiment product.

DETAILED DESCRIPTION OF THE PREFERRED EMBODIMENT(S)

Figure 1:
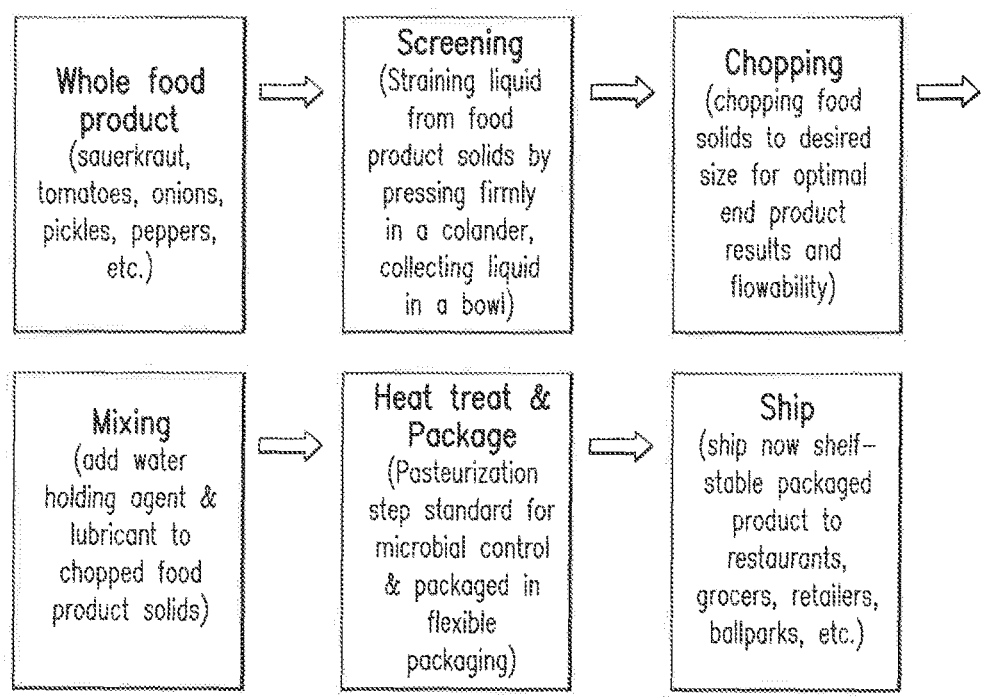
FIG. 1 is a flowchart showing the process used to prepare a flowable food composition of the present invention.

The present invention also includes a base food product that will be made flowable, such as sauerkraut, peppers, pickles, tomatoes, basil, onions, ketchup, mustard, relish and other products containing fruits, vegetables, herbs, meat products, legumes and tubers. The food product is combined with at least two additional components: one or more water-holding agents and one or more lubricating agents.

The present invention provides a flowable food composition with a combination of two separate ingredients used to hold water and lubricate ingredients of foods commonly used as condiments and other similar types of foods. More specifically, a fiber (more specifically, a fiber containing 20% or more of insoluble fiber components) is used as a water-holding ingredient along with a lubricating agent (e.g. food gums, starches, or oils) that allows the excess free liquid in a food product to be absorbed and held while still yielding a moist and desirable end product. Examples of fibers the may be used in connection with the present invention include fibers from oats, wheat, peas, carrots, apples, citrus, bamboo, potato, cottonseed, cellulose and microcrystalline cellulose.

The water-holding and lubricating agents of the present invention can be applied to many base food products, including, but not limited to, horseradish, sauerkraut, peppers, tomatoes, basil, pickles, onions, ketchup, mustard, relish and other products containing herbs, fruits, vegetables, meat products, legumes and tubers.

The combination of the water-holding and lubricating ingredients with the base food product for the purpose of creating a flowable food composition is what makes the present invention unique and beneficial in comparison to prior art food compositions. The addition of the water-holding agent and lubricating agent to the base food product to absorb any excess free liquid in the base food product while maintaining a moist end product, resulting in a higher quality flowable food composition that exhibits improved flowability.

The present invention includes a water-holding agent that absorbs, binds, and holds free water or liquid in the base food composition to avoid the water or liquid from sputtering or splattering from the flexible bottle when the flowable food composition is squeezed onto a food product by a consumer. More specifically, the water-holding agent is a fiber and more preferably, it is an insoluble fiber. Most preferably, the water-holding agent is an insoluble fiber containing 20% or more of insoluble fiber components. Examples of fibers the may be used in connection with the present invention include fibers from oats, wheat, peas, carrots, apples, citrus, bamboo, potato, cottonseed, cellulose and microcrystalline cellulose. The specific fiber used as the water-holding agent of the present invention often will vary based upon the base food product that it will be used with. For example, if the base food product is sauerkraut, it has been found that the preferred water-holding agent is a citrus fiber.

The present invention also includes lubricating agent that aids in the base food product flowing from the flexible bottle when the flowable food composition is squeezed onto a food product by a consumer. Preferably, the lubricating agent is a hydrocolloid, such as a food gum, starch, or oil. More preferably, the lubricating agent is guar gum, xanthan gum, carboxymethylcellulose (CMC), sodium alginate or pectin. Most preferably, the lubricating agent is xanthan gum, as xanthan gum appeared to function the best as a lubricating agent in test formulations.

The flowable food composition of the present invention is produced using the method illustrated in FIG. 1. The base food product, such as horseradish, sauerkraut, peppers, tomatoes, basil, pickles, onions, ketchup, mustard, relish and other products containing herbs, fruits, vegetables, meat products, legumes and tubers, as discussed herein, is first sufficiently screened, or strained, to remove the majority of the excess free liquid or water from the base food solids. In cases where the base food product does not contact significant amounts of free liquid or water, there is no need to screen or strain the base food product to remove this limited amount of free liquid or water. The screening or straining of the free liquid or water from the base food product may be done by firmly pressing the base food solids in a colander while collecting the excess free liquid in a separate bowl. In connection with the present invention, it is only necessary to remove the free liquid or water from base food components having significant amounts of free liquid or water (for example, the brine of sauerkraut) by straining or screening, or by other similar mechanical means. It is not necessary to actively dry the based food product, nor is it necessary to remove liquid or water that is bound within the base food product.

Next the base food solids, which have been adequately screened, are chopped to improve the flowability of the final product. The chopping size will vary depending upon the base food product being utilized, but preferably the base food product is chopped to a ½ inch size or ½ inch strand length, or more preferably the base food product is chopped to a ¼ inch size or ¼ inch strand length, to allow it to flow freely through the spout in a standard squeeze bottle, which generally ranges in size from ¼ inch to ¾ inch and most often in the range of ½ inch to ¾ inch. However, any chopping size the reduces the size of the base food product sufficient to allow the base food product to easily flow through the spout of the squeeze bottle to be used to package the flowable food composition of the present invention is sufficient. For example, for a finer product such as a flowable pesto the base food product will be chopped to a puree consistency, while for a coarser product such as a flowable sauerkraut the base food product will be chopped to a sauerkraut strand length of approximately ¼" or ½".

An amount of 5% to 50% by weight, or more preferably 22% to 30% by weight and most preferably 25% to 27% by weight, based on the total weight of the food product solids after a majority of free liquid has been extracted, of the base food free liquid previously removed from the base food product is then added back into the base food solids. The ranges discussed herein are most appropriate with base food products with significant amounts of free liquid or water. However, where the base food product has relatively little free liquid or water, such that it was not necessary to strain or screen the free liquid or water from the base food product, the addition of the free liquid or water back into the base food solids is not necessary and may be skipped. In no circumstances should additional water (as opposed to free liquid or water previously removed from the base food product) be added into the base food solids.

The water-holding and lubricating agents are then added to the base food product solids. An amount of 0.05% to 3.0% by weight, or more preferably 0.05% to 0.5% by weight and most preferably 0.05% to 0.3% by weight, based on the total weight of the food product solids after a majority of the free liquid has been extracted, of the water-holding agent and an amount of 0.01% to 3.0% by weight, or more preferably 0.01% to 0.5% by weight and most preferably 0.01% to 0.3% by weight, based on the total weight of the food product solids after a majority of the free liquid has been extracted, of the lubricating agent is added to the base food product mixture and mixed well to create the flowable food composition of the present invention.

The flowable food composition of the present invention is then treated for microbial control prior to packaging in any way known in the art, such as by pasteurization, heat treatment, or exposure to radiation, or immediately packaged and sealed and then treated for microbial control. The heat treatment step is standard for microbial control and any method of microbial control known in the art may be used.

The flowable food composition is then shelf-stable and ready to be shipped to restaurants, grocers, major retailers, industrial venues such as ballparks, and food service companies nationwide.

As such, the general process for producing the flowable food composition of the present invention is as follows:
  A. If the base food product contains significant amounts of free liquid, separate the raw material base food product solids from the base food product free liquid by straining the free liquid from the solids using a colander (gently squeezing and applying pressure to solids until free liquid no longer drips from the colander) and collect the free liquid in a bowl.

B. Weigh the base food product solids to determine the base weight to be used to determine the amounts of ingredients to be added in later steps.

C. Chop the base food product solids in a food processor until reaching the desired consistency.

D. Place chopped food solids in mixing bowl.

E. Add back 1%-50% by weight of base food free liquid (based on the total weight of the base food product solids in Step B) to the chopped base food product solids.

F. Measure out 0.05%-3.0% by weight of the desired water-holding agent (based on the total weight of the base food product solids in Step B).

G. Measure out 0.01%-3.0% by weight of the desired lubricating agent (based on the total weight of the base food product solids in Step B).

H. Add the water-holding agent and the lubricating agent to the base food product solid and free liquid mixture in the mixing bowl.

I. Mix the solid and free liquid base food mixture, water-holding agent and lubricating agent thoroughly.

J. Perform microbial control step, such as pasteurization, and package and seal the finished flowable food composition in as flexible package. Alternatively, the microbial control step may be completed after the finished flowable food composition has been sealed in the flexible package.

K. Ship the packaged flowable food composition for consumer use nationwide.

The forgoing provides a general process for producing the flowable food composition of the present invention in a small scale or bench-top setting. This process may be scaled up, automated, or be completed using food processing equipment known in the art in order to convert to larger scale production.

While certain ranges for certain ingredients for the flowable food composition of the present invention are disclosed and described herein, it will be recognized by one skilled in the art that the specific amounts of each ingredient will vary based upon the base food product being used to create the flowable food composition. For example, for the production of flowable sauerkraut, pesto, pickle, and onion compositions, the following most preferable amounts for the base food free liquid, water-holding agent, and lubricating agent (in percent by weight of base food solids) are used:

TABLE 1

Example preferable formulations for flowable sauerkraut, pesto, pickle, and onion compositions of the present invention.

| | Base Food Free Liquid | Water-Holding Agent | Lubricating Agent |
|---|---|---|---|
| Sauerkraut | 25% | 0.08% | 0.24% |
| Pesto | 0.03% | 0.1% | 16% (due to presence of olive oil) |
| Pickle | 22% | 0.08% | 0.16% |
| Onion | 11% | 0.2% | 0.1% |

As may be seen in the above Table 1, some food compositions, such as pesto, may have certain ingredients that cause the amounts for the base food free liquid, water-holding agent, or lubricating agent to fall outside the various ranges discussed herein, while still being a flowable food composition of the present invention. For example, pesto has little to no free liquid or water so the flowable pest composition of the present invention includes only 0.03% by weight of base food solids of base food free liquid, while the pesto also includes significant amounts of olive oil, which acts as a lubricating agent, so it includes 16% by weight of base food solids of lubricating agent.

As a more specific example of the method used to produce a flowable food composition of the present invention for testing purposes using these ingredients, a flowable sauerkraut condiment food product was produced. The water-holding agents used in separate tests included fibers derived from citrus, oat and wheat. The lubricating agents tested in multiple variations included guar gum, xanthan gum, carboxymethylcellulose (CMC), sodium alginate and pectin.

The sauerkraut was emptied from its original container and the free liquid was separated from the sauerkraut solids by straining the free liquid from the solids using a colander and gently squeezing and applying pressure to solids until free liquid no longer drips from the colander. The free liquid was collected in a bowl.

The solids and free liquid were then each weighed. The sauerkraut was divided into a test and a control of equal weights for comparison purposes. An amount of the free liquid equal to approximately 25-26% by weight (based upon the total weight of the test sauerkraut solids) was then added to the test sauerkraut solids. Half of the free liquid removed from the sauerkraut solids was then added to the control sauerkraut solids, such that the control sauerkraut sample contained an amount of free liquid equivalent to the unstrained and unscreened sauerkraut.

The water-holding agent in an amount of approximately 0.08% of the total solid weight of the sauerkraut solids after a majority of the brine was extracted and approximately 0.24% by weight of a lubricating agent were then measured out. The water-holding agent and lubricating agent were then added to the test sauerkraut solid and free liquid mixture and mixed well. For purposes of comparison, the water-holding agent and lubricating agent were not added to the control sauerkraut solids.

Figure 2A:
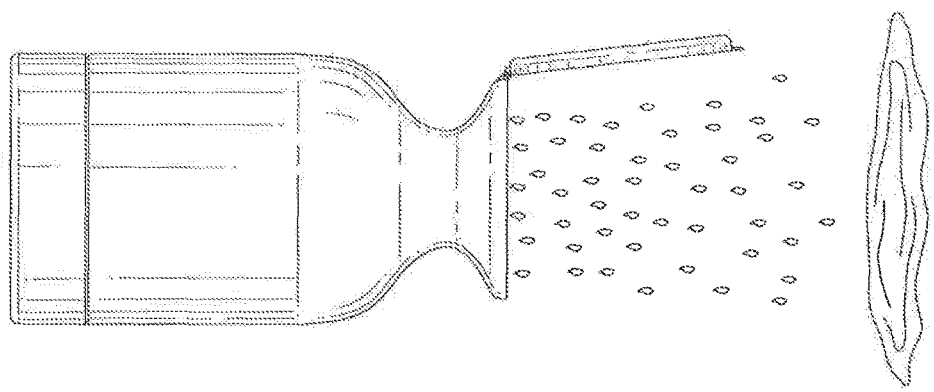
FIG. 2A is a perspective view of prior art food compositions when such a composition is attempted to be squeezed from a flexible package.
Figure 2B:
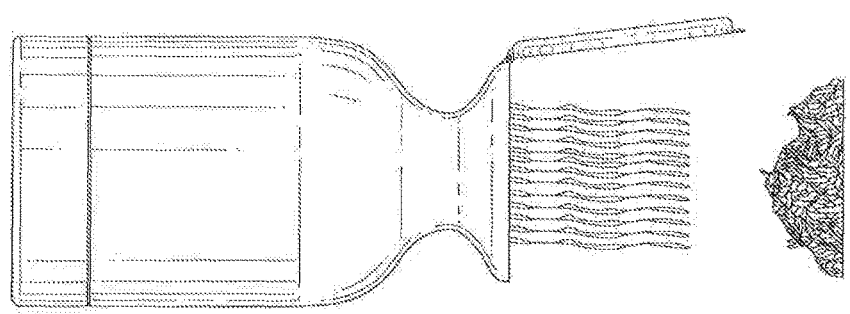
FIG. 2B is a perspective view of food compositions of the present invention when such a composition is squeezed from a flexible package.

As illustrated in FIGS. 2A and 2B, the test and control mixtures were then put in squeezable plastic bottles with wide-mouthed caps. The test sample with the water-holding and lubricating agent blend smoothly flowed from the bottle when the bottle was squeezed. The sauerkraut squeezed from the test sample also exhibited a consistent texture. In contrast, the control sample did not flow from the bottle smoothly when the bottle was squeezed, instead, only the excess free liquid from the control sample sputtered out inconsistently, leaving a plug of sauerkraut solids plugging the cap's mouth making the sauerkraut unable to exit the bottle during squeezing. Based upon the comparison of the test and control sauerkraut flowable food composition samples from above, it was clear that the test sample flowed significantly better than the control sample.

EXAMPLE(S)

The present invention was tested with multiple food products, as set forth herein.

Example 1

Sauerkraut

Many consumers enjoy condiment foods such as sauerkraut on their bratwursts, hamburgers, hotdogs, sausages, etc. Unlike sauerkraut currently sold in cans, glass jars or plastic poly bags where any unused sauerkraut is either wasted or emptied into another storage container for later consumption, a sauerkraut product made in accordance with the present invention can be used just like a current ketchup or mustard condiment product. That is, the consumer squeezes the desired amount of condiment onto their food, then doses the bottle and may use any remaining sauerkraut in the bottle at a later time without the need for another separate container. Having the option of a flowable sauerkraut product allows the consumer to avoid having to otherwise open a can, jar or plastic poly bag of product and use a utensil to get the sauerkraut from the package onto their food product or dispense it into a separate container for serving, as well as avoid wasting any unused portions of the sauerkraut.

The present invention can be applied to produce a flowable sauerkraut composition whereby 0.05%-3.0% by weight (based on the total weight of the sauerkraut solids) of a water-holding agent binds excess free liquid from the sauerkraut and 0.01%-3.0% by weight (based on the total weight of the sauerkraut solids) of a lubricating agent reduces the friction so the sauerkraut exits a squeezable package easily.

The excess brine is screened from the sauerkraut solids and the solids are chopped using a food chopper to a strand length of approximately ¼" to 1½" to allow for better flowability. The chopped sauerkraut is then weighed and an amount of brine of approximately 25% to 26% of the total weight of the sauerkraut solids after the brine has been extracted is then added back into the chopped sauerkraut. Extracting the majority of the brine from the sauerkraut solids, as performed in lab testing, involves pressing the sauerkraut solids firmly in a colander and draining the free liquid into a bowl until the brine is no longer dripping from the collander. The preferred range of brine added that was consistently used in testing which resulted in optimal sensory characteristics of the final product was 25% to 27% by weight. If the amount of brine added is outside of a range of 20%-30%, the additional brine will adversely affect the end product's texture and amount of lubricating and water-holding agents needed, such that higher amounts of brine are undesirable.

An amount of a lubricating agent (such as xanthan gum or another type of hydrocolloid) of approximately 0.08% by weight of the total weight of the solids after the majority of the brine has been extracted is then measured out. The most preferable range of amount of lubricating agent consistently used in testing which resulted in optimal sensory characteristics of the final product was 0.10%-0.15%. Amounts of the lubricating agent that fall outside of the 0.01%-3.0% by weight range will adversely affect the final product's flowability or texture or mouthfeel. For example, if no or too little lubricating agent is used (such as less than 0.01% by weight) the final product will not easily flow from the bottle. If too much lubricating agent is used (more than 3.0% by weight) the final product will have a slimy mouthfeel and appearance, which is undesirable to consumers. In testing, xanthan gum seemed to work better than other lubricating agents and as, such, the lubricating agent is preferably a xanthan gum.

Similarly, the water-holding agent is added to the sauerkraut product. The most preferable range of water-holding agent is 0.05% to 0.3%. If too much of the water-holding agent is used, the resulting end product has a cloudy appearance and/or a mushy texture, while using too little prevents excess the brine from being absorbed properly by the water-holding agent and the final product tends to sputter or wheeze when exiting the package.

Once the appropriate amounts of brine, lubricating agent and water-holding agent are determined and measured out, the three ingredients are then mixed together and added to the chopped sauerkraut until well blended.

The flowable sauerkraut food product is then heat treated, packaged and considered shelf stable with a shelf life of at least twelve months. The sauerkraut product is ready to be shipped to restaurants, grocers, major retailers, industrial venues such as ballparks and food service companies nationwide to be offered to consumers for purchase and consumption.

As illustrated in FIG. 2A, without the use of the water-holding and lubricating agents, prior art sauerkraut products would ultimately not be flowable because the sauerkraut, without any lubricating agent, solids clog and plug the spout of the container, preventing any additional sauerkraut from exiting the bottle. The excess brine, unbound due to the lack of any water-holding agents, spurts, sputters, or splatters out in a messy manner onto the consumer's food. Therefore, prior are sauerkraut products cannot be effectively squeezed out of a flexible bottle.

However, as shown in FIG. 2B, the sauerkraut food composition produced in accordance with the present invention effectively flows from the package and may be squeezed out by a consumer onto the consumer's food easily and without any mess, Example 2

Pesto

A flowable pesto product according to the present invention was developed in lab testing utilizing sundried tomatoes, fresh basil leaves, olive oil, garlic, pine nuts, parmigiano reggiano cheese and a water-holding agent. The sundried tomatoes and fresh basil leaves were chopped to a puree consistency. Olive oil, ground pine nuts and finely shredded parmigiano reggiano cheese were then added to the tomato and basil mixture and mixed well. Since the pureed pesto had little free liquid or water, it was unnecessary to screen or strain free liquid from the pesto. Likewise, since no pesto free liquid was screened or strained from the pesto, no free liquid was added back into the pesto. In lab testing, approximately 0.1% by weight (based on the total weight of the pesto solids) of a water-holding ingredient was used to evaluate flowability of the product from a squeezable package. Since the pesto already included olive oil (approximately 16% by weight of pesto solids), which acts as a lubricating agent, it is unnecessary to add any additional amounts of lubricating agents to the pesto. The resulting flowable pesto composition was found to effectively flow from a squeezable package and may be squeezed out by a consumer onto the consumer's food easily and without any mess.

Example 3

Pickles

In accordance with the present invention, a water-holding agent and a lubricating agent can also be added to chopped pickles to make a flowable pickle product. In lab testing, sliced dill pickle chips were chopped to a similar texture or slightly larger in size than that of pickle relish, which resulted in chopped pickle of approximately ¼" in size. The chopped pickles included relatively little free liquid or water, such that the free liquid or water did not need to be screened or strained from the pickles and, likewise, did not need to be added back into the chopped pickles. A water-holding agent in the range of 0.1%-0.5% by weight (based on the total weight of the pickle solids), preferably approximately 0.08% by weight, and a lubricating agent in the range of 0.0%-0.2% by weight (based on the total weight of the pickle solids), preferably approximately 0.16% by weight, was then added and mixed to create a flowable pickle product. The flowable pickle product was found to effectively flow from a squeezable package.

Example 4

Onions

Onions were also tested in the lab to determine flowability with a water-holding agent and lubricating agent added in accordance with the present invention. Both fresh diced onions and frozen diced onions were tested separately and both types of onions were chopped to a size of approximately ¼ in size. The chopped onions included relatively little free liquid or water, such that the free liquid or water did not need to be screened or strained from the onions and, likewise, did not need to be added back into the chopped onions. A water-holding agent in the amount of 0.0%-0.2% by weight (based on the total weight of the onion solids), preferably approximately 0.2% by weight, and a lubricating agent in the amount of 0.0%-0.2% by weight (based on the total weight of the onion solids), preferably approximately 0.1% by weight, were then added to create a flowable onion product. The flowable onion composition was found to easily flow from a squeezable package and may be squeezed out by a consumer onto the consumer's food easily and without any mess.

While the invention has been described in the specification and illustrated in the drawings with reference to certain preferred embodiments, it will be understood by those skilled in the art that various changes may be made and equivalents may be substituted for elements thereof without departing from the scope of the present invention as defined in the appended claims. In addition, many modifications may be made to adapt a particular situation or material to the teachings of the invention, as defined in the appended claims, without departing from the essential scope thereof. Therefore, it is intended that the present invention not be limited to the particular embodiments illustrated by the drawings and described in the specification as the best modes presently contemplated for carrying out the present invention, but that the present invention will include any embodiments falling within the description of the appended claims.

What is claimed is:

1. A shelf-stable flowable food composition comprising:
   sauerkraut, wherein the sauerkraut comprises a sauerkraut brine and sauerkraut solids, the sauerkraut solids have been chopped to a length falling within the range of 0.25 inch to 1.5 inch, and the amount of sauerkraut brine is within the range of from about 20% to about 30% by weight, wherein the percentage of sauerkraut brine by weight is based upon the total weight of the sauerkraut solids;
   citrus fiber in an amount of 0.05% to 3.0% by weight, wherein the percentage by weight is based upon the total weight of the sauerkraut solids; and
   a lubricating agent, wherein the amount of lubricating agent is within the range of 0.01% to 0.3% by weight, wherein the percentage by weight is based upon the total weight of the sauerkraut solids;
   wherein the sauerkraut brine is bound to and held by the citrus fiber such that the sauerkraut brine does not separate from the flowable food composition when the flowable food composition is subjected to pressure, wherein the flowable food composition is a heterogeneous mixture, and wherein the flowable food composition includes a lubricated interface within the sauerkraut solids formed by the bound sauerkraut brine and lubricating agent when the flowable food composition is subjected to pressure thereby allowing the sauerkraut solids to flow, and
   wherein the shelf-stable composition has a shelf life of at least twelve months.

2. The shelf-stable flowable food composition of claim 1, wherein the sauerkraut solids have been chopped to a length falling within the range of 0.25 inch to 1.0 inch.

3. The shelf-stable flowable food composition of claim 1, wherein the lubricating agent is a hydrocolloid.

4. The shelf-stable flowable food composition of claim 3, wherein the hydrocolloid is xanthan gum.

5. The shelf-stable flowable food composition of claim 3, wherein the hydrocolloid is selected from the group consisting of guar gum, carboxymethylcellulose (CMC), sodium alginate and pectin.

6. The shelf-stable flowable food composition of claim 1, wherein the amount of sauerkraut brine is within the range of 22% to 30% by weight, wherein the percentage by weight is based upon the total weight of the sauerkraut solids.

7. The shelf-stable flowable food composition of claim 6, wherein the amount of sauerkraut brine is within the range of 25% to 27% by weight, wherein the percentage by weight is based upon the total weight of the sauerkraut solids.

8. The shelf-stable flowable food composition of claim 1, wherein the flowable food composition is packaged within a squeezable plastic bottle and the squeezable plastic bottle includes a spout defining an opening, and wherein the opening of the spout is less than or equal to approximately ¾ inches in diameter.

* * * * *